United States Patent
Soni et al.

(10) Patent No.: US 7,682,501 B2
(45) Date of Patent: Mar. 23, 2010

(54) PROCESSING OF DIFFERENT FEEDS IN A FLUID CATALYTIC CRACKING UNIT

(75) Inventors: Dalip S Soni, Houston, TX (US); Leonce F Castagnos, Montgomery, TX (US)

(73) Assignee: ABB Lummus Global, Inc., Bloomfield, NJ (US)

( * ) Notice: Subject to any disclaimer, the term of this patent is extended or adjusted under 35 U.S.C. 154(b) by 772 days.

(21) Appl. No.: 11/021,274

(22) Filed: Dec. 23, 2004

(65) Prior Publication Data
US 2006/0138027 A1    Jun. 29, 2006

(51) Int. Cl.
*C10G 11/00*    (2006.01)
(52) U.S. Cl. .......................... 208/113; 208/153; 208/157
(58) Field of Classification Search .................. 208/113, 208/153, 157
See application file for complete search history.

(56) References Cited

U.S. PATENT DOCUMENTS

| | | | |
|---|---|---|---|
| 4,051,013 A | 9/1977 | Strother | 208/78 |
| 4,122,149 A | 10/1978 | Dunnery et al. | 423/242 |
| 4,170,628 A | 10/1979 | Kosseim et al. | 423/243 |
| 4,374,019 A | 2/1983 | Hettinger, Jr. et al. | 208/120 |
| 4,407,714 A | 10/1983 | Myers | 208/120 |
| 4,490,241 A | 12/1984 | Chou | 208/75 |
| 4,832,825 A | 5/1989 | Mauleon et al. | 208/157 |
| 4,892,643 A | 1/1990 | Herbst et al. | 208/70 |
| 4,950,387 A | 8/1990 | Harandi et al. | 208/49 |
| 4,990,314 A | 2/1991 | Herbst et al. | 422/144 |
| 5,057,205 A | 10/1991 | Chin et al. | 208/121 |
| 5,251,565 A | 10/1993 | Phillips | 110/346 |
| 5,286,691 A | 2/1994 | Harandi et al. | 502/41 |
| 5,318,689 A | 6/1994 | Hsing et al. | 208/70 |
| 5,547,648 A | 8/1996 | Buchanan et al. | 423/210 |
| 5,637,207 A | 6/1997 | Hsing et al. | 208/164 |
| 5,846,403 A | 12/1998 | Swan et al. | 208/113 |
| 6,126,813 A | 10/2000 | Fersing et al. | 208/164 |
| 6,613,290 B1 | 9/2003 | Senior | 422/140 |

FOREIGN PATENT DOCUMENTS

| | | |
|---|---|---|
| EP | 0 259 153 | 3/1988 |
| EP | 0 323 297 | 7/1989 |
| EP | 0 849 347 | 6/1998 |
| EP | 1 013 743 | 6/2000 |

*Primary Examiner*—In Suk Bullock
*Assistant Examiner*—Prem C. Singh
(74) *Attorney, Agent, or Firm*—Baker & Hostetler LLP

(57) ABSTRACT

An apparatus and method for processing different feeds in a fluid catalytic cracking unit are disclosed which result in improved yields of $C_3$, $C_4$ and gasoline range hydrocarbons as compared to conventional systems. The process comprises injecting a main hydrocarbon feed into a catalyst-containing riser reactor through a plurality of main feed injectors, and injecting a light hydrocarbon feed into the riser reactor at a location upstream from the main feed injectors and downstream from a control valve such as a regenerated catalyst slide valve, the light feed being injected in a region having a high density of catalyst particles. The light feed is injected in a dispersed way such the amount of feed injected corresponds to the density of catalyst particles at that particular point, with greater amounts of feed being injected at locations having a large number of catalyst particles. Also, a heavy hydrocarbon feed or a heavy recycle stream from the same FCC unit can be injected at the same elevation as the main feed injectors but through separate injectors.

24 Claims, 3 Drawing Sheets

PROCESSING OF DIFFERENT FEEDS IN A FLUID CATALYTIC CRACKING UNIT

BACKGROUND OF THE INVENTION

The invention generally relates to the Fluid Catalytic Cracking (FCC) process and more particularly to an apparatus and method for processing feed streams having very different compositions or boiling ranges in the same FCC unit.

In fluid catalytic cracking processes, it is often necessary to process different feed streams that have very different properties or boiling point ranges in the same FCC unit. These streams can be straight run or cracked materials from other conversion units, or recycled materials from the same FCC unit. One of the streams is generally the main feed while others are supplemental feeds intended to maximize production of a certain product from the FCC unit.

The various feed streams may require very different cracking conditions due to very different molecular size/structure. As a result, a number of modifications to the conventional FCC process have been developed in which these streams are fed at different locations in the riser reactor. In general, the lower boiling or lower molecular weight materials require more severe conditions to crack, while higher boiling materials require less severe conditions. Materials rich in aromatics are difficult to crack and form increased quantities of coke, which reduces the effectiveness of the catalyst. These considerations need to be taken into account in determining the best way to process the different streams.

U.S. Pat. No. 4,051,013, issued Sep. 27, 1977, is directed to a fluid catalytic cracking process for simultaneously cracking a gas oil feed and upgrading a gasoline-range feed to produce high quality motor fuel. According to this patent, the lower boiling gasoline-range feed is contacted with freshly regenerated catalyst in a portion of the riser reaction zone that is relatively upstream from the portion of the riser reaction zone in which the higher boiling gas oil feed is injected. However the lighter gasoline feed is injected at a single point that does not provide uniform and thorough contact of the catalyst and the feed.

U.S. Pat. No. 4,892,643, issued Jan. 9, 1990, discloses a catalytic cracking operation using a single riser reactor in which two different types of cracking catalysts are employed. In this process, heavy hydrocarbon feed is introduced to the riser reactor upstream from the lighter feed. Cracking of the heavy feed produces a significant quantity of naphtha, which is then combined with a downstream naphtha feed.

U.S. Pat. No. 5,846,403, issued Dec. 8, 1998, discloses a method of improving the yield of light olefins in a FCC process while simultaneously increasing the octane rating of gasoline produced in the process. According to this method, a light catalytic naphtha feed and steam are injected upstream of the conventional FCC feed injection point. However the lighter feed is injected at a single point of injection. This method does not provide uniform and thorough contact between the catalyst and the light feed, and, as a result, conversion and yield of the desired products are not maximized. Also, in this process the heavier feed is mixed with conventional FCC feed, i.e. gas oil, and is injected in the riser through the same feed injectors as the main feed. This design does not provide optimum conditions for heavier feed to vaporize and undergo the desirable catalytic cracking reactions.

Therefore, it would be useful to develop a method for processing different feeds in a single riser reactor of a FCC unit wherein the location as well as the method of injection are designed so that the different feed streams can uniformly and thoroughly contact the high activity catalyst at the catalyst temperature that is best suited for maximum catalytic conversion of these individual streams, and the contact time between the catalyst and the different feeds is optimized so that production of the desirable products is maximized.

SUMMARY OF THE INVENTION

The invention optimizes the precise location, and the method and apparatus for injection of different feeds in a single riser reactor of a FCC unit.

An object of the invention is to provide a method for improving the yield of $C_3$ and $C_4$, and optionally also gasoline range hydrocarbons in a FCC process.

Another object of the invention is to provide an apparatus that can be used for efficiently processing hydrocarbon streams of various feed types to obtain higher yields of $C_3$ and $C_4$ hydrocarbons. The feeds can all be from an external source, or can be a combination of external feeds and recycle streams from the same FCC unit.

A further object of the invention is to provide a method for improving the conversion rate in a fluid catalytic cracking process and hence improving the yield of gasoline range material.

Another object of the invention is to recycle a heavier fraction of the product stream from a FCC unit back to the riser to increase conversion and/or to return solid catalyst particles back to the reaction system.

Another object of the invention is to recycle a relatively lighter fraction of the product stream from the FCC unit back to the riser to increase the yield of $C_3$ and $C_4$ olefins.

Yet another object of the invention is to provide a method of reducing the formation of coke and other low value products, e.g. compounds with two or fewer carbon atoms, in a FCC process.

Other objects of the invention will be in part obvious and in part pointed out in more detail hereafter.

The invention in a preferred form is a fluid catalytic cracking process for increasing yields of $C_3$ and $C_4$ hydrocarbons, comprising the steps of injecting a main feed comprising hydrocarbons with boiling points in the range of 400° F. to 1150° F. (when measured at atmospheric pressure) into a riser reactor of a FCC apparatus through a set of main feed injectors, and injecting a light feed comprising hydrocarbons with boiling points which are no more than about 440° F. (when measured at atmospheric pressure) into the fluid catalytic cracking apparatus through a plurality of light feed injectors disposed upstream from the main feed injectors proximate locations at which the catalyst flow changes direction. In one embodiment of the invention, a set of injectors for light feed are positioned upstream of the injectors for main feed in such a way as to follow the contour of the catalyst flow so that the contact of the lighter feed with the catalyst is maximized.

Preferably, the light feed is injected into a conduit portion of the riser reactor. As the catalyst travels through the conduit, the conduit usually develops a lower catalyst density region and a higher catalyst density region. The light feed is injected through multiple injectors, which are positioned such that a larger portion of the light feed is injected into the higher catalyst density region than the lower catalyst density region.

The process preferably further comprises the step of injecting a heavy feed comprising hydrocarbons with boiling points in the range of 570° F. to 1275° F. (when measured at atmospheric pressure) through a set of injectors for heavy feed. These injectors are usually located approximately at the same elevation on the riser reactor as the main feed injectors. In other words the heavier or difficult to vaporize/crack feed is separately injected through a separate set of feed injectors that may be specially designed to take into account the unique properties of this material, e.g. the presence of some solid particles. The heavier/difficult to crack feed is generally recycle of the heavy fraction of the products from the FCC unit. Typically, the mass flow rate of the heavy feed through the heavy feed injectors is about 1-10 wt % of the mass flow rate of the main feed through the main feed injectors, preferably 3-7 wt % and more preferably about 5 wt %. In one embodiment, about 1 to 10 wt % of the main feed is recycled and injected as heavy feed through the heavy feed injectors.

The light feed usually is injected downstream from a control valve, which is positioned between the catalyst regenerator and the conduit portion of the riser reactor. The control valve preferably is a regenerated catalyst slide valve.

The yield of $C_3$ and $C_4$ hydrocarbons from the process of the invention typically is at least 2% higher than the yield of $C_3$ and $C_4$ hydrocarbons in a process that is substantially identical with the exception that the light feed is injected at a single location upstream from the main feed. The yield of propylene usually is at least 2% higher than the yield of propylene in a process in which the light feed is injected at one location upstream from the main feed, but otherwise seems identical. The yield of $C_4$ olefins preferably is at least 1% higher than the yield of olefins in a process in which the light feed is injected at one location upstream from the main feed.

The catalyst used is typically of the range of catalysts usually employed in a FCC process and preferably is a zeolite.

Another preferred form of the invention is a fluid catalytic cracking process for increasing yields of $C_3$, $C_4$ and gasoline range hydrocarbons, comprising injecting a main feed comprising hydrocarbons with boiling points in the range of 400° F. to 1150° F. (when measured at atmospheric pressure) into a riser reactor of a fluid catalytic cracking apparatus through a set of main feed injectors, and injecting a heavy feed comprising hydrocarbons with boiling points in the range of 570° F. to 1275° F. (when measured at atmospheric pressure) through a set of heavy feed injectors positioned at approximately the same elevation on the riser reactor as the set of main feed injectors. Preferably, the process further comprises the step of injecting a light feed comprising hydrocarbons with boiling points of no more than about 440° F. into the fluid catalytic cracking apparatus through multiple injectors positioned upstream from the main feed injectors. The light feed usually is injected into a conduit portion of the riser reactor.

A further preferred form of the invention is a fluid catalytic cracking apparatus comprising a catalyst regenerator and a riser reactor having a set of main hydrocarbon feed injectors connected thereto. The riser reactor includes a conduit portion fluidly connected to the catalyst regenerator for receiving regenerated catalyst. The conduit portion includes an angled section located upstream from the set of main hydrocarbon feed injectors. The angled section has a plurality of light hydrocarbon feed injectors formed thereon. The angled section is configured to change the direction of catalyst flow. Often, the injectors are configured to inject light hydrocarbon feed generally in the same direction in as the flow of the catalyst. Optionally, the injectors for light feed can be positioned to inject the feed in a direction which is countercurrent to the direction of the catalyst flow.

In yet another embodiment, the invention is a fluid catalytic cracking apparatus comprising a catalyst regenerator and a riser reactor having a set of main hydrocarbon feed injectors connected thereto. The riser reactor includes a conduit portion fluidly connected to the catalyst regenerator for receiving regenerated catalyst. A set of heavy hydrocarbon feed injectors is positioned at approximately the same elevation on the riser reactor as the set of main hydrocarbon feed injectors. The heavy feed injectors can be set up in a way as to inject the feed countercurrent to the direction of the catalyst flow. The fluid catalytic cracking apparatus preferably further comprises a plurality of light hydrocarbon feed injectors positioned upstream from the main hydrocarbon feed injectors.

DETAILED DESCRIPTION OF THE INVENTION

Figure 1:
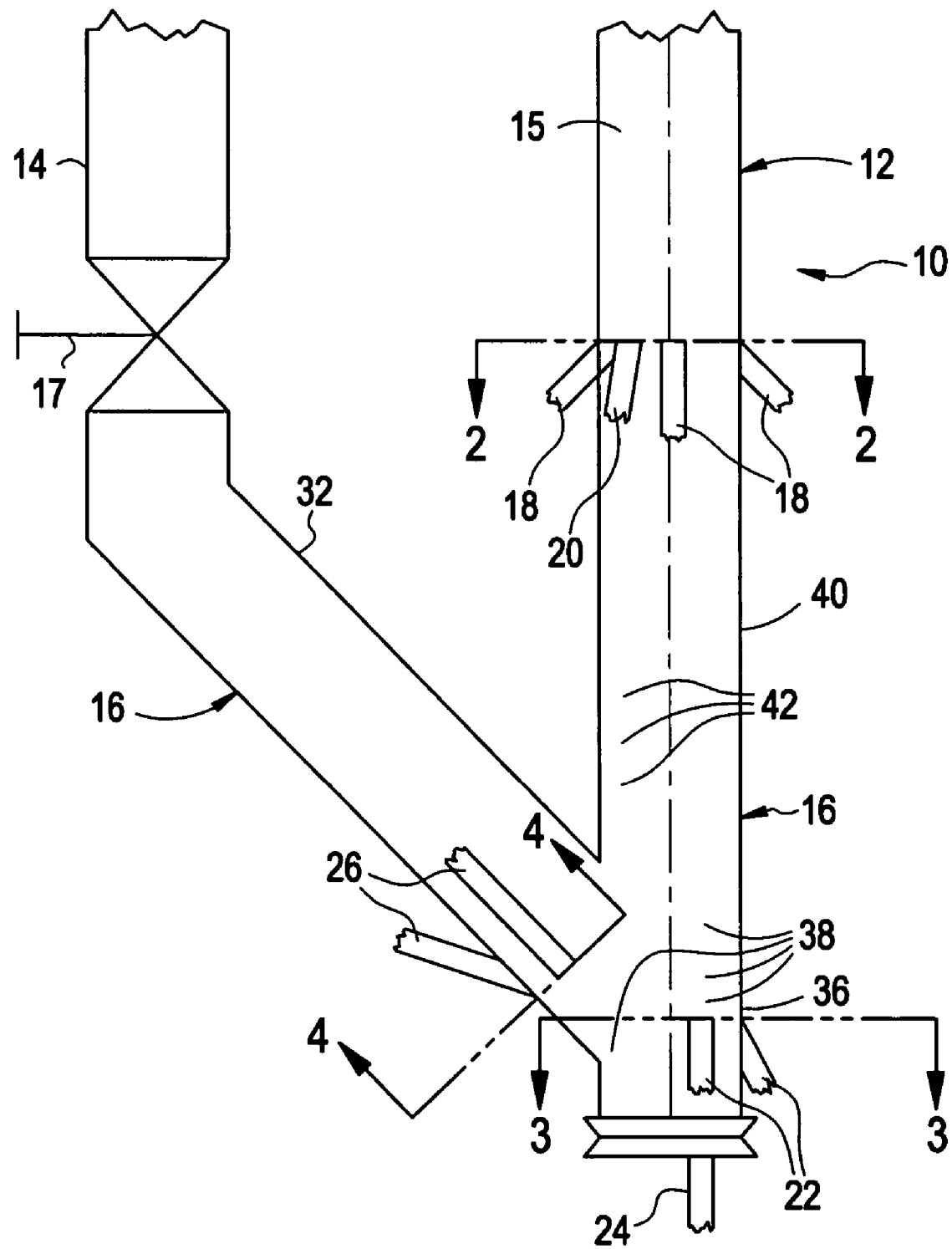
FIG. 1 is a side elevational view of a portion of a fluid catalytic cracking unit including the connection between the riser reactor and the regenerated catalyst standpipe.

In accordance with the invention, various feed streams are injected at appropriate points in the conduit portion of the riser reactor such that the process conditions available at those points match the cracking requirements for the injected streams. Inlet streams are fed in such a way that there is uniform and thorough mixing of the feed streams with the catalyst at each point of injection so that conversion of these materials is maximized.

Generally stated, the heavier feed stream, which may be a recycle stream, is injected at approximately the same location in the riser as the main feed, but through different injectors, so that this feed can be quickly vaporized and the coke production from the stream is minimized. The lighter feed, which also can be recycled product from the FCC unit, is injected upstream of the main injection point where cracking severity is very high in order that cracking of the lower molecular weight hydrocarbon compounds is maximized.

The technique for injecting the light feed upstream from the main feed injectors takes into consideration the catalyst flow pattern around the injection points. The catalyst flow undergoes a change of direction as it flows from the regenerated catalyst standpipe to the riser. As the catalyst changes direction, its flow is not uniform across the cross section of the conduit. Thus, the way the lighter feed is injected is important. According to the invention, the lighter feed is injected at number of points downstream of the regenerated catalyst slide valve, keeping in view the catalyst flow pattern. The feed is injected in a distributed way and not at one location such that the areas with greater concentration of the catalyst particles get a greater amount of feed. In other words, the dispersed feed injection follows the density contour of the catalyst in the conduit. This uniform injection of the feed with respect to the catalyst maximizes catalyst effectiveness due to increased contact of the feed with the catalyst. If the feed is injected at one location as is done in the conventional process, the catalyst effectiveness is reduced as the feed contacts only a smaller number of catalyst particles.

In conventional processes in which heavy feed is injected downstream of the main feed injectors, the heavy feed does not vaporize properly due to a lower temperature at that point. The unvaporized liquid feed can result in coke deposits on the equipment downstream. In addition, some of the unvaporized and unconverted feed ends up in the regenerator where it can burn and increase the catalyst temperature, adversely affecting the performance of the FCC unit. The conversion and the yield of lighter products will be reduced due to a reduced catalyst circulation rate as a result of the increased regenerator temperature. If the heavy feed is injected upstream from the main feed injection point, a larger amount of coke is formed on the regenerated catalyst before it meets the main feed. This reduces the catalyst activity and hence the conversion of the main feed and the yield of valuable products.

Figure 2:
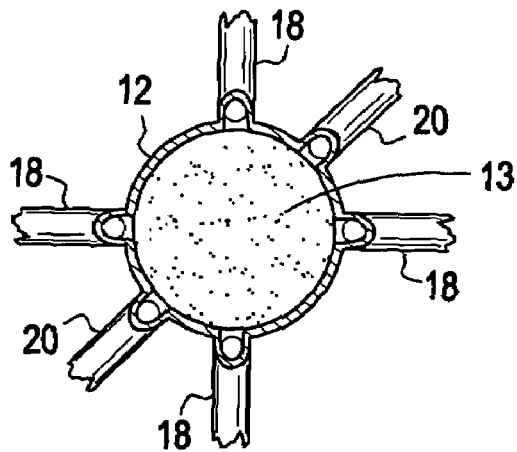
FIG. 2 is a sectional view taken along line 2-2 of FIG. 1.

Referring now to the drawings and first to FIGS. 1 and 2, a portion of a FCC unit relevant to this invention is shown and is designated as 10. This portion 10 includes a riser reactor 12 and a regenerated catalyst standpipe 14. The lower portion of the riser reactor 12 is a Y-shaped conduit 16 which connects the regenerated catalyst standpipe 14 to the main section 15 of the riser reactor 12, which is above the main feed injectors. The riser reactor 12, including the conduit 16, is filled with catalyst. The catalyst density profile is such that the vertex portion 36 of the conduit 16 is a high catalyst density region 38, and the vertical portion 40 of the conduit downstream from the vertex portion 36 includes a low catalyst density region 42. Catalyst 13 flows from the regenerator (not shown) to the regenerated catalyst standpipe 14, through the regenerated catalyst slide valve 17, into the conduit 16, and up into the main section 15 of the riser reactor 12. The flow rate of the regenerated catalyst into the riser reactor 12 is controlled by the regenerated catalyst slide valve 17. As the catalyst moves from the downwardly slanted portion 32 of the conduit 16 to the vertex portion 36 and vertically upward, its density within the cross section of the vertical portion 40 of the conduit 16 is not uniform. This is because of the momentum with which the catalyst is flowing down and the force it exerts on the far wall while changing direction in order to move vertically upward. Due to this, a greater amount of catalyst moves along the far wall at the upper end of the vertex portion 36 along the region shown as 38 and a lesser amount of catalyst moves along the region 42. In view of this catalyst density profile, the light feed is injected at various points along the vertex portion 36 of the conduit to take advantage of the high catalyst concentration in this high density area.

The catalyst flow becomes uniform as it moves up the vertical portion of the conduit 16. A plurality of main feed injectors 18 are connected to the riser reactor 12 at the downstream end of the conduit 16, where the catalyst flow is usually uniform. In the embodiment shown in the figures, the injectors 18 are slanted upwardly to direct the main feed generally in the direction of catalyst flow. However, these injectors could be slanted downwardly. At the same vertical height as the main feed injectors 18, a plurality of injectors 20 for heavier feed also can be disposed. The heavy feed injectors 20 also are slanted upwardly to direct the heavy feed generally in the direction of catalyst flow. However these could also be positioned to inject the feed downwardly. The heavier hydrocarbons are more difficult to vaporize or crack than the hydrocarbons in the main feed. It is advantageous for the heavy feed to be injected separately from the main feed instead of blending it with the main feed and feeding it through the same injectors. The inventors have found that by injecting the heavy feed separately, the larger/heavier molecules see or meet the high temperature catalyst particles separately and get vaporized quickly. On the other hand, when heavy feed is injected with the main feed as described in U.S. Pat. No. 5,846,403, the larger/heavier molecules see or meet the catalyst particles that have been quenched or cooled by the lighter/smaller molecules of the main feed. Thus, some heavier molecules may not vaporize. This leads to higher coke formation and deterioration of the FCC unit performance. In addition, the heavier feed may sometimes contain catalyst or solid particles, particularly if it constitutes a recycle of the heavier fraction from the FCC product slate. Such situations require special or different design of the injectors for the heavy feed. If the heavier feed with solids in it is mixed with the injectors designed for the main feed, the injectors will be eroded by the catalyst particles and the unit performance will deteriorate.

As used herein, the "main feed" has a boiling point in the range of 400° F. to 1150° F. if measured at atmospheric pressure, more preferably 430° F. to 1100° F., and most preferably 460° F.-1050° F. The "heavy feed" has a boiling point when measured at atmospheric pressure in the range of 570-1275° F. typically 600° F. to 1250° F., and more preferably 650° F. to 1250° F. The "light feed" has a lower boiling point than the main feed and typically has a boiling point when measured at atmospheric pressure of 440° F. or less, more preferably 430° F. or less and most preferably 400° F. or less.

Conventional FCC catalysts can be used in accordance with the invention, including but not limited to those with a crystalline tetrahedral framework oxide component. Preferably, the catalyst is selected from the group consisting of catalysts based on zeolite crystalline structure. More preferably, the catalyst is based on an Ultra stable Y (USY) Zeolite with a high Silica to Alumina ratio. This FCC catalyst may be used either alone or in combination with a shape selective pentasil zeolite catalyst structure like ZSM-5 that converts larger linear hydrocarbon compounds, such as olefins, to smaller olefins.

Figure 3:
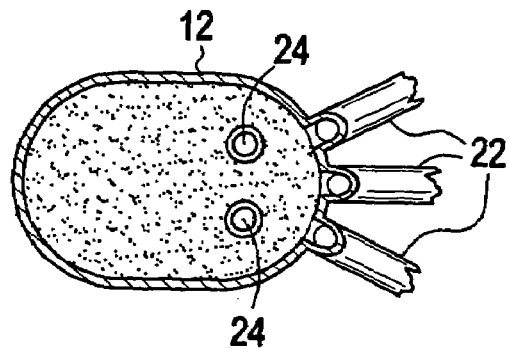
FIG. 3 is a sectional view taken along line 3-3 of FIG. 1.
Figure 4:
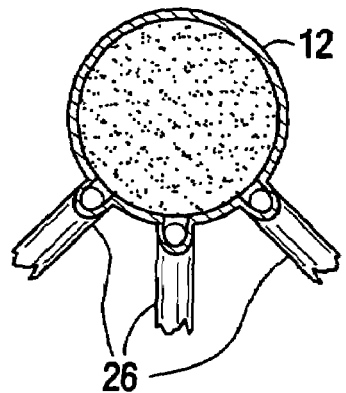
FIG. 4 is a sectional view taken along line 4-4 of FIG. 1.

As is shown in FIGS. 1, 3 and 4, light feed is injected upstream from the main feed injectors through a number of light feed injectors 22, 24 and 26. Light feed injectors 22 are positioned on the vertical wall of the vertex portion 36 of conduit 16 at or proximate locations at which catalyst flow changes direction. As indicated above, the catalyst density in the vertex portion 36 is the highest. The injectors 22 are shown in FIG. 1 as being slanted upwardly in the direction of catalyst flow through the riser but could be directed horizontally or downwardly. Injectors 24 are positioned at the bottom of the vertex portion 36 and inject light feed upwardly in a vertical direction. Light feed injectors 26 are disposed on the upstream end of the vertex portion 36 on the lower wall of the conduit 16 and are angled slightly downwardly relative to a horizontal direction. As a result of the multiple feed injector configuration provided by light feed injectors 22, 24 and 26, the light feed is distributed along the path of catalyst flow in such a manner that the region 38 of higher catalyst density in vertex portion 36 gets a higher flow of the feed than regions with lower catalyst density.

Cracked hydrocarbons and the catalyst flow up the riser reactor 12 and are separated at the end of the riser by means of a solid vapor separation device (not shown) that could be a cyclonic or an inertial/gravity separator. Alternatively the riser may be designed to discharge the solid vapor mixture in a large vessel (not shown) for gravity separation of the solids and the vapor. The separated catalyst, known as spent catalyst, is then sent to a stripping zone where hydrocarbons entrained with the catalyst are removed. The spent catalyst then flows to a catalyst regenerator where the coke on the catalyst is burned off to regain catalyst activity. The regenerated catalyst is then conducted through the regenerated catalyst standpipe 14 and along conduit 16 where it comes into contact with light hydrocarbon feed in the manner described above.

One of the important advantages of providing separate feed injectors for the main, heavy and light feeds is that the apparatus and method of the present invention can be used for cracking feeds of various boiling ranges in a single FCC unit and achieve high performance by producing high value products.

Figure 5:
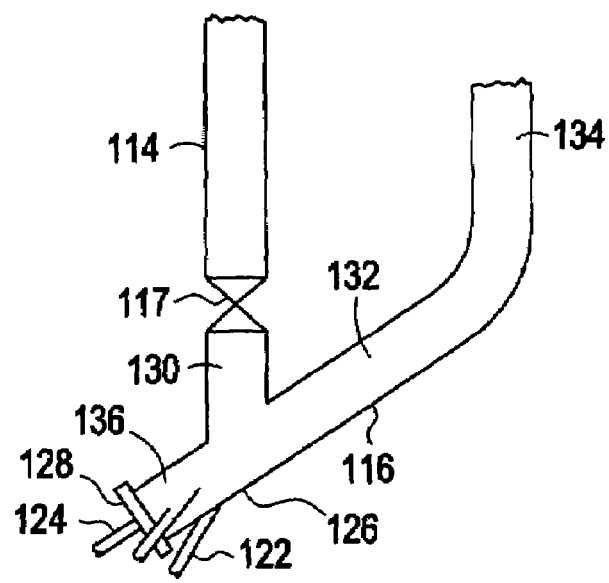
FIG. 5 is a side elevational view of a second embodiment of a portion of a fluid catalytic cracking unit including the connection between the riser reactor and the regenerated catalyst standpipe.
Figure 6:
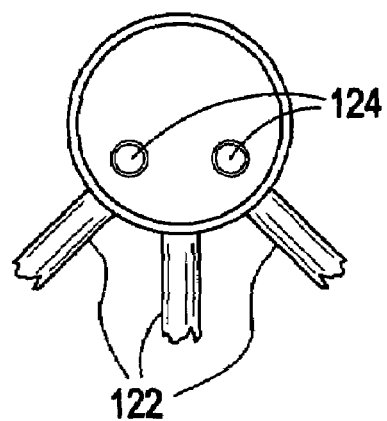
FIG. 6 is a lower end view of the embodiment shown in FIG. 5.
Figure 7:
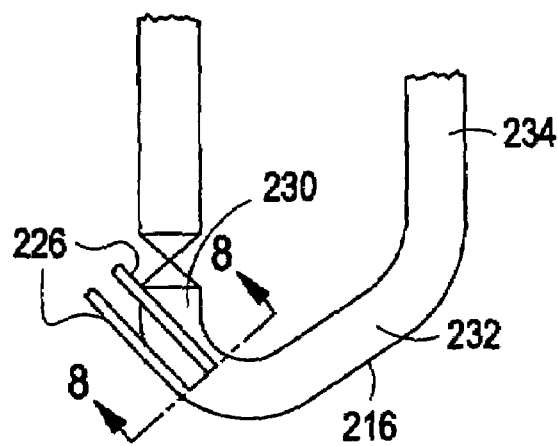
FIG. 7 is a side elevational view of a third embodiment of a portion of a fluid catalytic cracking unit including the connection between the riser reactor and the regenerated catalyst standpipe.
Figure 8:
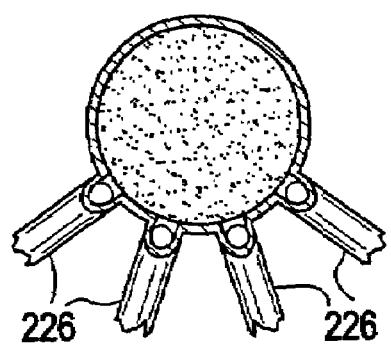
FIG. 8 is a sectional view taken along line 8-8 of FIG. 7.

The conduit portion of the riser reactor can have any of a variety of different configurations. Several additional non-limiting examples are shown in FIGS. 5 to 8. FIGS. 5 and 6 show a conduit portion 116 with a first portion 130 extending vertically downward from a regenerated catalyst slide valve 117 which is below a regenerated catalyst standpipe 114, a second portion 132 slanted upwardly relative to the first portion 130, and a vertical third portion 134 which connects the upper end of the second portion 132 to the main part of the riser reactor. The lower end 136 of the second portion 132 is below the point of connection between the first portion 130 and the second portion 132 and has a plurality of light feed injectors 122 formed on the side wall 126, and a plurality of light feed injectors 124 formed on the lower end wall 128. FIGS. 7 and 8 depict a conduit 216 with a similar shape as conduit 116 in that a first portion 230 extends vertically downward from a regenerated slide valve and a second portion 232 is slanted upwardly from the first portion and is connected to the lower end of a vertically extending third portion 234, which is connected to the main part of the riser reactor. Multiple injectors 226 enter the conduit 216 at the vertex between the first portion 230 and the second portion 232.

Regardless of the configuration, the principal basis of this invention remains the same, i.e. the lighter feed is injected upstream of the main feed injection point and in a dispersed way such that the higher catalyst density regions get a greater amount of this lighter feed, and the contact time of the lighter feed with the catalyst before this mixture meets the main feed injectors is optimized. The heavy feed is injected at approximately the same location as the main feed but through separate injectors.

The invention typically results in an increase in conversion of the lighter hydrocarbon feed by at least 15% as compared to conventional methods of injection or processing of this feed. This conversion increase in turn results in an increase in yields of $C_3$ and $C_4$ hydrocarbons by at least 11%, and often as much as 18%. In addition, the injection of the heavier recycle stream as described in this invention results in a conversion increase of the main feed by about 2%. Gasoline plus $C_3$ and $C_4$ yield increases by at least 5% and often by 8% as compared to the conventional processes.

The following examples are included to illustrate further important features and benefits of the invention, but are not to be construed as limiting.

COMPARATIVE EXAMPLE 1

In this example, main feed with a boiling range of 460° F. to 1000° F. is processed along with a lighter feed of a boiling range 145° F. to 375° F. in conventional manner. The riser reactor is operated at a temperature of 1015° F. at its outlet and a pressure of 25 psig using USY catalyst without any addition or use of shape selective pentasil zeolite. This cracking process yields the product slate shown below in Table 1:

TABLE 1

| Products | Wt % |
| --- | --- |
| Methane | 1.0 |
| Ethane | 1.0 |
| Ethylene | 1.3 |
| Propane | 1.8 |
| Propylene | 7.2 |
| i-Butane | 4.0 |
| n-Butane | 1.5 |
| Butenes | 8.2 |
| Total LPG ($C_3$ s + $C_4$ s) | 22.7 |
| Gasoline ($C_5$ to 430° F.) | 52.1 |
| Light Cycle Oil (430 to 670° F.) | 10.2 |
| Frac. Bottoms (670° F.+) | 6.7 |

The remaining 5 wt % is coke that deposits on the catalyst and is burned off in the regenerator.

EXAMPLE 1

The process of Comparative Example 1 is repeated with the exception that the light feed is injected upstream of the main feed in the light feed injectors 22, 24 and 26 shown on FIG. 1. The increase in yield of light components as compared to the process of Comparative Example 1 is summarized in Table 2.

TABLE 2

| Products | Wt % |
| --- | --- |
| Methane | +0.1 |
| Ethane | +0.1 |
| Ethylene | +0.2 |
| Propane | +0.4 |
| Propylene | +1.0 |
| i-Butane | +0.3 |
| n-Butane | +0.1 |
| Butenes | +0.8 |
| Total LPG ($C_3$ s + $C_4$ s) | +2.6 |

The increase in production of light components is due to the increase in conversion of the lighter feed.

EXAMPLE 2

The process of Comparative Example 1 is repeated with the exception that the heavier feed (the heaviest fraction of the product from the first pass conversion) that is recycled from the same FCC unit is injected through multiple injectors at the same height as the main feed, but through separate injectors. The conversion of the main feed is improved over the conversion rate of Comparative Example 1. Improvements in yield of $C_3$, $C_4$, and gasoline range hydrocarbons as compared to the process of Comparative Example 1 are shown in Table 3 below:

TABLE 3

| Product | Wt % |
| --- | --- |
| Propane | +0.05 |
| Propylene | +0.2 |
| i-Butane | +0.1 |
| n-Butane | +0.05 |
| Butenes | +0.2 |
| Total LPG ($C_3$ s + $C_4$ s) | +0.6 |
| Gasoline (C5 to 430° F.) | +0.8 |

These yield improvements are achieved even in the case when light feed is not injected in the FCC unit.

EXAMPLE 3

The processes of Examples 1 and 2 are combined such that the heavy feed is injected at the same height as the main feed but through different injectors, and the light feed is injected through light feed injectors 22, 24 and 26. Improvements in yield of $C_3$, $C_4$, and gasoline range hydrocarbons as compared to the results of Comparative Example 1 are shown in Table 4 below:

TABLE 4

| Product | Wt % |
| --- | --- |
| Methane | +0.1 |
| Ethane | +0.1 |
| Ethylene | +0.2 |
| Propane | +0.45 |
| Propylene | +1.2 |
| i-Butane | +0.4 |
| n-Butane | +0.15 |
| Butenes | +1.0 |
| Total LPG ($C_3$ s + $C_4$ s) | +3.2 |
| Gasoline ($C_5$ to 430° F.) | +0.8 |

Thus, it can be seen that by injecting lighter feed upstream of the main feed injection point and through multiple injectors at locations surrounding the area over which the change in direction of catalyst flow occurs, the conversion and yield of $C_3$ and $C_4$ hydrocarbons in a FCC process can be improved. In addition it can be seen that by injecting the heavier feed at approximately the same elevation as the main feed injection point but through separate injectors, the yields of $C_3$, $C_4$ and gasoline range hydrocarbons can be markedly improved. The advantages of both the above operations are additive when these are carried out at the same time.

What is claimed is:

1. A fluid catalytic cracking process for increasing yields of $C_3$ and $C_4$ hydrocarbons, comprising:
   (a) injecting a main feed comprising hydrocarbons with boiling points in the range of 400° F. to 1150° F. into a riser reactor of a fluid catalytic cracking apparatus through a set of main feed injectors, the riser reactor including a downwardly slanted portion and a vertical portion disposed downstream from the downwardly slanted portion, and
   (b) injecting a light feed comprising hydrocarbons with boiling points of no more than about 440° F. into said fluid catalytic cracking apparatus through a first light feed injector disposed at the lower end of the riser reactor and through a second light feed injector disposed on the downwardly slanted portion of the riser reactor upstream from the first light feed injector, the first and second light feed injectors being positioned at locations at which catalyst flow changes direction and is not uniform.

2. A process according to claim 1, wherein said light feed is injected into a conduit portion of said riser reactor.

3. A process according to claim 2, wherein said conduit portion has a lower catalyst density region and a higher catalyst density region.

4. A process according to claim 3, wherein said light feed is injected into said higher catalyst density region.

5. A process according to claim 3, wherein a larger portion of said light feed is injected into said higher catalyst density region than into said lower catalyst density region.

6. A process according to claim 1, further comprising the step of:
   (c) injecting a heavy feed comprising hydrocarbons with boiling points in the range of 570° F. to 1275° F. through a set of heavy feed injectors.

7. A process according to claim 6, wherein said set of heavy feed injectors is positioned at the same elevation on said riser reactor as said set of main feed injectors.

8. A process according to claim 5, further comprising the step of:
   (c) injecting a heavy feed comprising hydrocarbons with boiling points of in the range of 570° F. to 1275° F. through a set of heavy feed injectors.

9. A process according to claim 8, wherein said set of heavy feed injectors is positioned at the same elevation on said riser reactor as said set of main feed injectors.

10. A process according to claim 7, wherein about 1 to 10 wt % of said main feed is recycled and injected in step (c).

11. A process according to claim 7, wherein the mass flow rate of said heavy feed through said heavy feed injectors is about 1 to 10 wt % of the mass flow rate of said main feed through said main feed injectors.

12. A process according to claim 2, wherein said light feed is injected downstream from a control valve positioned between said catalyst regenerator and said conduit portion of said riser reactor.

13. A process according to claim 12, wherein said control valve is a regenerated catalyst slide valve.

14. A process according to claim 1, wherein the yield of $C_3$ and $C_4$ hydrocarbons from said fluid catalytic cracking process is improved by at least 2% over a process in which said light feed is injected at one location upstream from said main feed.

15. A process according to claim 1, wherein the yield of propylene is at least 2% higher than the yield of propylene in a process in which said light feed is injected at one location upstream from said main feed.

16. A process according to claim 1, wherein said catalyst is a zeolite.

17. A fluid catalytic cracking process for increasing yields of $C_3$, $C_4$ and gasoline range hydrocarbons, comprising:
   (a) injecting a main feed comprising hydrocarbons with boiling points in the range of 400° F. to 1150° F. into a riser reactor of a fluid catalytic cracking apparatus through a set of main feed injectors, the riser reactor including a downwardly slanted portion and a vertical portion disposed downstream from the downwardly slanted portion,
   (b) injecting a heavy feed comprising hydrocarbons with boiling points in the range of 570° F. to 1275° F. through a set of heavy feed injectors positioned at the same elevation on said riser reactor as said set of main feed injectors, and
   (c) injecting a light feed comprising hydrocarbons with boiling points of no more than about 440° F. into said fluid catalytic cracking apparatus through first and second light feed injectors positioned upstream from said main feed injectors at locations at which catalyst flow changes direction and is not uniform, the second light feed injector being positioned on the downwardly slanted portion of the riser reactor.

18. A process according to claim 17, wherein said light feed is injected into a conduit portion of said riser reactor.

19. A process according to claim 18, wherein said conduit portion has a lower catalyst density region and a higher catalyst density region, and a larger portion of said light feed is injected into said higher catalyst density region than into said lower catalyst density region.

20. A process according to claim 1, further comprising injecting a light feed comprising hydrocarbons with boiling points of no more than about 440° F. into said fluid catalytic cracking apparatus through a third light feed injector disposed adjacent to the first light feed injector.

21. A process according to claim 20, further comprising injecting a light feed comprising hydrocarbons with boiling points of no more than about 440° F. into said fluid catalytic cracking apparatus through a fourth light feed injector disposed adjacent to the second light feed injector.

22. A process according to claim 21, wherein the fourth light feed injector injects light feed into the downwardly slanted portion.

23. A process according to claim 17, wherein the second light feed injector is disposed upstream from the first light feed injector.

24. A process according to claim 23, wherein light feed is injected through a third light feed injector disposed adjacent to the first light feed injector and a fourth light feed injector disposed adjacent to the second light feed injector.

* * * * *